United States Patent
Han et al.

(10) Patent No.: US 11,681,753 B2
(45) Date of Patent: Jun. 20, 2023

(54) GEOTAGGED VIDEO SPATIAL INDEXING METHOD BASED ON TEMPORAL INFORMATION

(71) Applicant: Henan University, Zhengzhou (CN)

(72) Inventors: Zhigang Han, Zhengzhou (CN); Caihui Cui, Zhengzhou (CN); Feng Liu, Zhengzhou (CN); Hongquan Song, Zhengzhou (CN); Haiying Wang, Zhengzhou (CN); Fen Qin, Zhengzhou (CN)

(73) Assignee: HENAN UNIVERSITY, Zhengzhou (CN)

( * ) Notice: Subject to any disclaimer, the term of this patent is extended or adjusted under 35 U.S.C. 154(b) by 0 days.

(21) Appl. No.: 17/944,344

(22) Filed: Sep. 14, 2022

(65) Prior Publication Data

US 2023/0079719 A1    Mar. 16, 2023

(30) Foreign Application Priority Data

Sep. 15, 2021    (CN) .......................... 202111081865.1

(51) Int. Cl.
G06F 16/787    (2019.01)
G06F 16/738    (2019.01)
G06F 16/71    (2019.01)

(52) U.S. Cl.
CPC ............ *G06F 16/787* (2019.01); *G06F 16/71* (2019.01); *G06F 16/738* (2019.01)

(58) Field of Classification Search
CPC ....... G06F 16/787; G06F 16/71; G06F 16/738
USPC ...................................................... 386/241
See application file for complete search history.

(56) References Cited

U.S. PATENT DOCUMENTS

2015/0116487 A1 *   4/2015   Ptitsyn ................ H04N 7/183
                                                       348/143

FOREIGN PATENT DOCUMENTS

CN           112364201 A  *  2/2021
WO    WO-2015096582 A1  *  7/2015   ....... G06F 17/30961

OTHER PUBLICATIONS

17944344_Nov. 18, 2022_CN_112364201_A_M (Year: 2021).*
17944344_Nov. 18, 2022_WO_2015096582_A1_M (Year: 2015).*

(Continued)

*Primary Examiner* — Loi H Tran
(74) *Attorney, Agent, or Firm* — Zhigang Ma

(57) ABSTRACT

A geotagged video spatial indexing method for video retrieval based on a two-dimensional (2D) temporal grid is disclosed and includes:
generating the 2D temporal grid by using the earliest start time, the latest end time of all geotagged video clips and a temporal resolution; calculating row and column number information of each geotagged video clip based on its start time and end time; generating a spatial point for each geotagged video clip based on the row and column number information and obtaining a spatial point set; generating a R-tree spatial index structure corresponding to the spatial point set using a R-tree spatial index method; and locating the corresponding cell in a temporal grid based on retrieval conditions, generating a spatial point based on row and column number information of the grid cell, and finding the spatial point in the R-tree spatial index structure to get the geotagged video corresponding thereto.

4 Claims, 3 Drawing Sheets

(56) References Cited

OTHER PUBLICATIONS

CNIPA, Notification of a First Office Action for CN202111081865.1, dated Mar. 25, 2022.
Henan University (Applicant), Reply to Notification of a First Office Action for CN202111081865.1, w/ replacement claims, dated Mar. 29, 2022.
Henan University (Applicant), Corrections for CN202111081865.1, w/ replacement claims, Apr. 2, 2022.
Henan University (Applicant), Supplemental Reply to Notification of a First Office Action for CN202111081865.1, w/ (allowed) replacement claims, dated Apr. 7, 2022.
CNIPA, Notification to grant patent right for invention in CN202111081865.1, dated Apr. 15, 2022.

\* cited by examiner

GEOTAGGED VIDEO SPATIAL INDEXING METHOD BASED ON TEMPORAL INFORMATION

TECHNICAL FIELD

The invention relates to the field of geographic information and video retrieval technologies, particular to a geotagged video spatial indexing method for video retrieval based on a two-dimensional (2D) temporal grid, which can be used in the field of massive geotagged video data management and analysis.

BACKGROUND

At present, public security has become one of the focuses of governments at all levels; the construction of video surveillance systems for public spaces has become a key link in ensuring public safety and deterring criminal behavior. With the continuous advancement of safe cities in China, massive amounts of video data have been accumulated countrywide; these videos are all geotagged videos that include shooting period and spatial location. Therefore, how to efficiently retrieve geotagged video data at the corresponding time has become a fundamental problem in large-scale surveillance video management and analysis. The geotagged video is a video that contains spatiotemporal information, and its retrieval methods currently mainly include the following three types: retrieval based on spatial information (SI), retrieval based on temporal information (TI), and retrieval based on semantic tags. The retrieval based on SI is mainly based on the location of the video shooting or the location of the video scene, and spatial relationship predicates are used to judge. The retrieval based on TI is mainly based on the time or time period of the video shooting. The retrieval based on semantic tags is mainly combined with video content for tagging, and the corresponding tag text is defined for video retrieval. At present, the retrieval based on TI has the following problems: (1) timestamps are mainly used for direct comparison, and the retrieval efficiency is low due to the complexity of data types of the timestamps; (2) an one-dimensional timeline method is mainly used, and the absolute time is used for judgment, and the 2D spatial semantics cannot be fully utilized for temporal information retrieval of geotagged videos; (3) the retrieval method is single, and a graphical video retrieval operation method based on temporal information is lacking.

SUMMARY

In order to solve at least some of the problems existing in the above-mentioned current geotagged video retrieval method based on TI, the invention mainly improves the geotagged video retrieval based on TI, and provides a geotagged video indexing method for video retrieval based on a 2D temporal grid, by defining 2D temporal grids, the efficient query and retrieval of the geotagged videos can be realized.

The invention discloses a geotagged video spatial indexing method for video retrieval based on a 2D temporal grid, including:

step 1: calculating row and column number information of each geotagged video clip by combining a start time and an end time of each geotagged video clip based on an earliest start time $T_s$, a latest end time $T_e$ and a temporal resolution of all geotagged video clips, and thereby mapping one-dimensional continuous time interval information to a 2D grid space based on corresponding temporal resolution to obtain the 2D temporal grid;

step 2: generating a spatial point for each geotagged video clip, based on the row and column number information of each geotagged video clip in the 2D temporal grid, and building a spatial point set P by the spatial points of all geotagged video clips;

step 3: generating a R-tree spatial index structure corresponding to the spatial point set P using a R-tree spatial index method;

step 4: accord to that starting time and the end time defined by the retrieval conditions, generating a corresponding point accord to the row and column number information in the 2D temporal grid, and searching the point in the generated R-tree spatial index structure to get the geotagged video clips corresponding to that point.

In an embodiment, in the step 1, the calculating row and column number information of each geotagged video clip, includes:

step A1: calculating original column number information u and row number information v of the k-th geotagged video clip under the temporal resolution ct using a formula (1):

$$\begin{cases} u = \dfrac{(t_k^s - T_s)}{ct} \\ v = \dfrac{(t_k^e - T_s)}{ct} \end{cases} \quad (1)$$

where $t_k^s$ and $t_k^e$ respectively represent the start time and the end time of the k-th geotagged video clip; $T_s$ represents the earliest start time among all geotagged video clips, $T_s = \min(\{t_k^s\})$, k=1, 2, 3 . . . K, and K represents a total number of the geotagged video clips;

step A2: expressing the original row and column number information in a form of a vector (u, v, 1), and obtaining the new column number information j and the new row number information i of the k-th geotagged video clip in the 2D temporal grid by calculating the vector according to preset rules;

the preset rules include:

j=u and i=v when 1≤u<(N+1)/2 and 1<v≤(N+1)/2;

the vector (u, v, 1) is converted to (j, i, 1) using a formula (2) when u>v+(N+1)/2, 1≤u≤(N+1)/2, and (N+1)/2<v≤N:

$$(j \ i \ 1) = (u \ v \ 1) \times \begin{pmatrix} 0 & 1 & 0 \\ 1 & 0 & 0 \\ -1 & 0 & 1 \end{pmatrix}; \quad (2)$$

the vector (u, v, 1) is converted to (j, i, 1) using a formula (3) when (N+1)/2<v≤u+(N+1)/2≤N, and 1≤u≤(N+1)/2:

$$(j \ i \ 1) = (u \ v \ 1) \times \begin{pmatrix} 1 & 0 & 0 \\ 0 & 1 & 0 \\ 0 & -\dfrac{(N+1)}{2} & 1 \end{pmatrix}; \quad (3)$$

the vector (u, v, 1) is converted to (j, i, 1) using a formula (4) when (N+1)/2<u≤N, and (N+1)/2≤v≤N:

$$(j \quad i \quad 1) = (u \quad v \quad 1) \times \begin{pmatrix} 1 & 0 & 0 \\ 0 & 1 & 0 \\ 0 & -\frac{(N+1)}{2} & 1 \end{pmatrix}; \quad (4)$$

where N represents columns of the 2D temporal grid, $N=(T_e-T_s-ct)/ct$, and $T_e$ represents the latest end time among all geotagged video clips, $T_e=\max(\{t_k^e\})$.

In an embodiment, in the step 2, the generating a spatial point for each geotagged video clip, includes:

taking the column number information j of the k-th geotagged video clip in the 2D temporal grid to be as x, and the row number information i of the k-th geotagged video clip in the 2D temporal grid to be as y, and thereby generating the spatial point $p_k$ (x, y) of the k-th geotagged video clip; where k=1, 2, 3 ..., K, and K represents a total number of the geotagged video clips.

In an embodiment, the step 3 includes:

performing segmentation on a spatial range where the spatial point set P is located to obtain rectangular regions; wherein each of the rectangular regions is called a directory rectangle and used as an intermediate node of a tree structure; and allocating the spatial points to the rectangular regions according to spatial locations, and generating sub-nodes of the intermediate nodes.

In an embodiment, in the step 4, the searching the point in the generated R-tree spatial index structure to get the geotagged video clips corresponding to that point, includes:

searching for the directory rectangle that satisfies the retrieval conditions and locating the searched directory rectangle into the intermediate node corresponding thereto; and then searching the sub-nodes of the located intermediate node to find a spatial point object that satisfy the retrieval conditions.

The invention has the following advantages and beneficial effects.

(1) The invention uses 2D grid column and row values to describe the start time and end time of geotagged video shooting, and performs processing based on integer data types, thereby reducing the computational complexity of temporal information.

(2) The invention performs retrieval and operation of temporal information on the 2D graphic space, breaking through the traditional one-dimensional timeline and timestamp-based temporal information retrieval method.

(3) By performing geotagged video retrieval and query according to the method of the invention, the test results show that the invention can significantly improve the query efficiency and reduce the query response time.

DETAILED DESCRIPTION OF THE EMBODIMENTS

In order to make the objectives, technical solutions and advantages of the invention clearer, the technical solutions in the embodiments of the invention will be clearly described below in combination with the drawings in the embodiments of the invention. Apparently, the described embodiments are part of the embodiments of the invention, not all of them. Based on the embodiments of the invention, all other embodiments obtained by a person of ordinary skill in the art without making creative labor fall within the scope of the invention.

Figure 1:
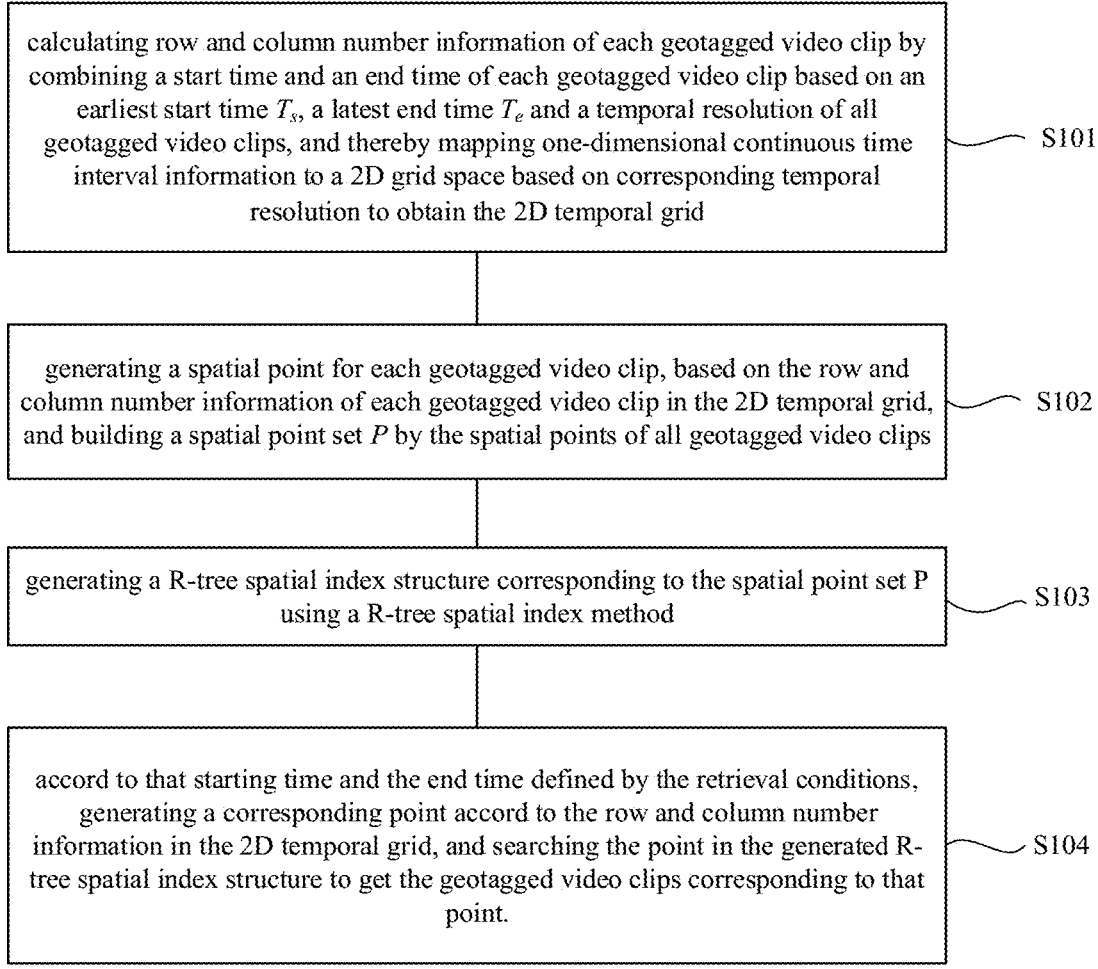
FIG. 1 is a flowchart of a geotagged video spatial indexing method for video retrieval based on temporal information provided by an embodiment of the invention.

As shown in FIG. 1, an embodiment of the invention discloses a geotagged video spatial indexing method for video retrieval based on a 2D temporal grid, including the following steps.

S101: based on an earliest start time $T_s$, a latest end time $T_e$ and a temporal resolution of all geotagged video clips, calculating row and column number information of each geotagged video clip by combining a start time and an end time of each geotagged video clip, and thereby mapping one-dimensional continuous time interval information to a 2D grid space based on corresponding temporal resolution to obtain the 2D temporal grid.

Specifically, this step S101 mainly defines the 2D temporal grid based on a grid structure in combination with the temporal resolution and temporal range.

Generally speaking, video clips shot with cameras or smartphones are all shot at a specific moment and have a certain shooting duration, and the time interval can be expressed as $[t_s, t_e]$, where $t_s$ and $t_e$ represent the start time and end time of the video clip, respectively. Please set the start time and end time of the k-th video clip as $t_k^s$ and $t_k^e$ respectively, and $t_k^s \le t_k^e$. In an illustrated embodiment, calculating the row and column number information of the k-th geotagged video clip specifically includes:

step A1: using a formula (1) to calculate original column number information u and row number information v of the k-th geotagged video clip under the temporal resolution ct:

$$\begin{cases} u = \frac{(t_k^s - T_s)}{ct} \\ v = \frac{(t_k^e - T_s)}{ct} \end{cases}; \quad (1)$$

Where $t_k^s$ and $t_k^e$ represent the start time and the end time of the k-th geotagged video clip, respectively; $T_s$ represents the earliest start time among all geotagged video clips, $T_s=\min(\{t_k^s\})$, k=1, 2, 3 ... K, K represents a total number of the geotagged video clips. The temporal resolution ct can be measured in hours, minutes, seconds, or other different durations.

step A2: expressing the original row and column number information in a form of a vector (u, v, 1), and obtaining the new column number information j and the new row number information i of the k-th geotagged video clip in the 2D temporal grid by calculating the vector according to preset rules.

The preset rules specifically include:

j=u and i=v when $1 \le u < (N+1)/2$ and $1 < v \le (N+1)/2$;

converting the vector (u, v, 1) to (j, i, 1) using a formula (2) when u>v+(N+1)/2, 1≤u≤(N+1)/2, and (N+1)/2<v≤N:

$$(j\ i\ 1) = (u\ v\ 1) \times \begin{pmatrix} 0 & 1 & 0 \\ 1 & 0 & 0 \\ -1 & 0 & 1 \end{pmatrix};\quad (2)$$

converting the vector (u, v, 1) to (j, i, 1) using a formula (3) when (N+1)/2<v≤u+(N+1)/2≤N, and 1≤u≤(N+1)/2:

$$(j\ i\ 1) = (u\ v\ 1) \times \begin{pmatrix} 1 & 0 & 0 \\ 0 & 1 & 0 \\ 0 & -\frac{(N+1)}{2} & 1 \end{pmatrix};\quad (3)$$

converting the vector (u, v, 1) to (j, i, 1) using a formula (4) when (N+1)/2<u≤N, and (N+1)/2≤v≤N:

$$(j\ i\ 1) = (u\ v\ 1) \times \begin{pmatrix} 1 & 0 & 0 \\ 0 & 1 & 0 \\ 0 & -\frac{(N+1)}{2} & 1 \end{pmatrix};\quad (4)$$

where N represents columns of the 2D temporal grid, $N=(T_e-T_s-ct)/ct$, and $T_e$ represents the latest end time among all the geotagged video clips. $T_e=\max(\{t_k^e\})$.

The row and column number information of all geotagged video clips can be obtained by calculating according to the above steps, and finally the 2D temporal grid with M rows and N columns can be obtained, where M=(N+1)/2.

Figure 2:
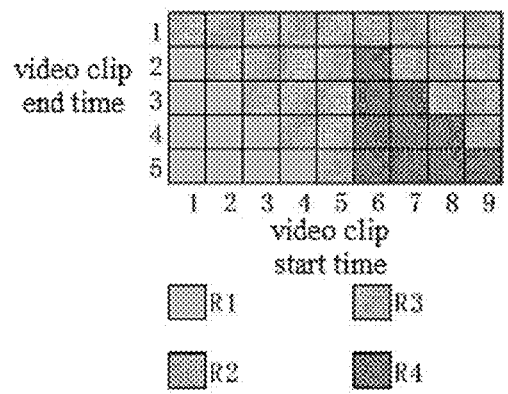
FIG. 2 is a schematic diagram of the 2D temporal grid provided by an embodiment of the invention.

It can be seen from the above embodiment that the 2D temporal grid includes a plurality of temporal grid cells, and location information of each temporal grid cell represents time period information of the geotagged video clip corresponding thereto. As shown in FIG. 2, column information of the 2D temporal grid represents the start time of the geotagged video clip, and row information of the 2D temporal grid represents the end time of the geotagged video clip, each temporal grid cell may be used to store an identification ID of the geotagged video clip. Still taking FIG. 2 as an example, it is assumed that the k-th geotagged video clip is located in the i-th row and j-th column of the 2D temporal grid, and its temporal grid is $C_k$ (j, i), and its time semantics are defined as follows:

(1) in R1 sub-region, i.e., when 1≤j<M, 1≤i<M and j<i, the time semantics of cell (j, i) starts at j and ends at i.

(2) in R2 sub-region, i.e., when M<j≤N, 1≤i<M and j≥i+M, the time semantics of cell (j, i) starts at i and ends at j+1.

(3) in R3 sub-region, i.e., when M<j≤N, 1<i≤M and j<i+M, the time semantics of cell (j, i) starts at j and ends at i+M.

(4) in R4 sub-region, i.e., when 1≤j≤M, 1≤i≤M and j≥i, the time semantics of cell (j, i) starts at j and ends at i+M.

S102: based on the row and column number information of each geotagged video clip in the 2D temporal grid, generating a spatial point for each geotagged video clip, and building a spatial point set P by the spatial points of all geotagged video clips.

Figure 3:
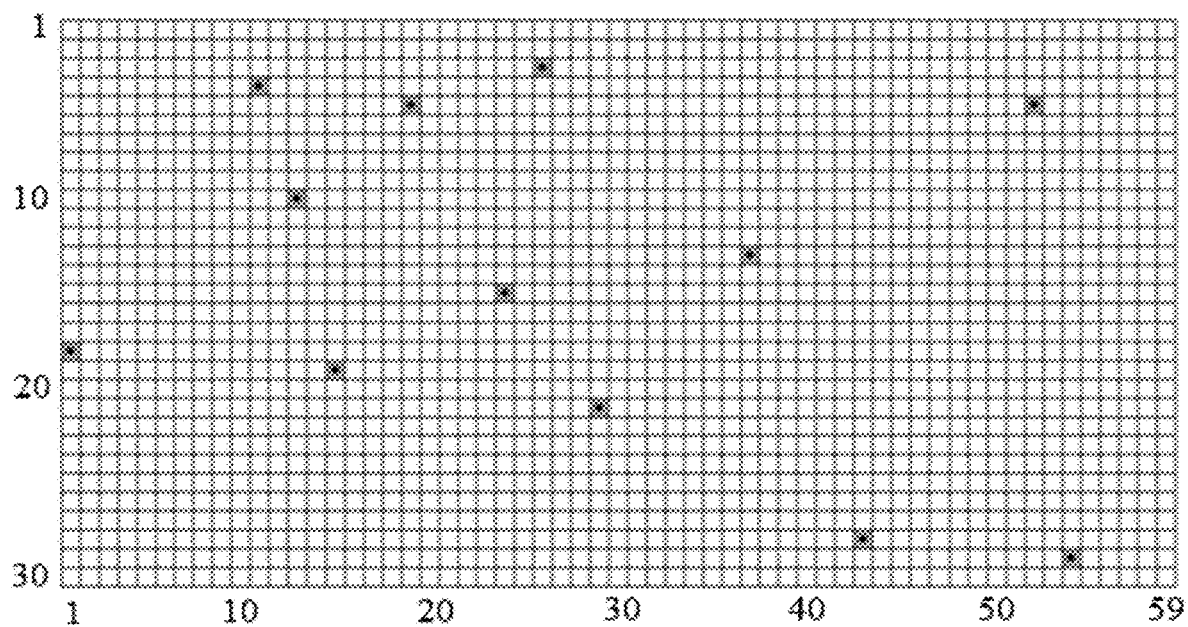
FIG. 3 is a schematic diagram of generating spatial point objects of geotagged video clips provided by an embodiment of the invention.

In an illustrated embodiment, as shown in FIG. 3, generating the spatial point for each geotagged video clip specifically includes: taking the column number information j of the k-th geotagged video clip in the 2D temporal grid to be as x, and the row number information i of the k-th geotagged video clip in the 2D temporal grid to be as y, and thereby generating the spatial point $p_k$ (x, y) of the k-th geotagged video clip; where k=1, 2, 3 . . . , K, and K represents a total number of the geotagged video clips.

S103: generating a R-tree spatial index structure corresponding to the spatial point set P using a R-tree spatial index method.

Figure 4:
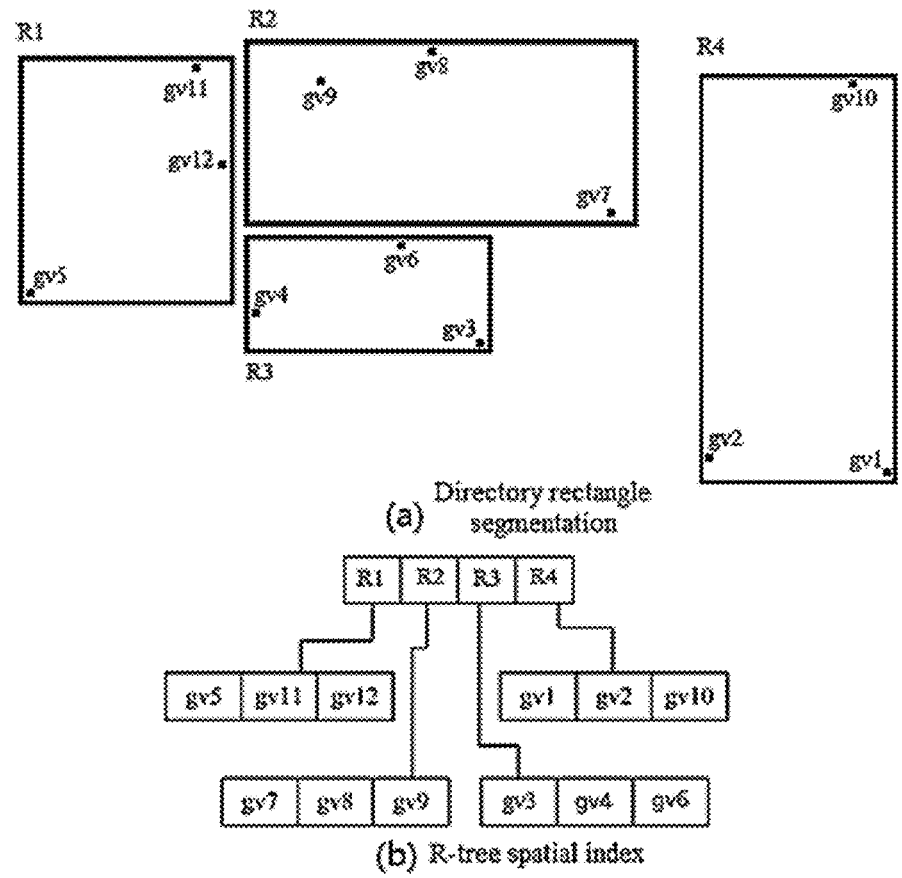
FIG. 4 is a schematic diagram of generating an R-tree spatial index structure provided by an embodiment of the invention.

In an illustrated embodiment, this step S103 specifically includes: performing segmentation on a spatial range where the spatial point set P is located to obtain rectangular regions; each rectangular region is called a directory rectangle and used as an intermediate node of a tree structure; and allocating the spatial points to the rectangular regions according to spatial locations, and generating sub-nodes of the intermediate nodes. As shown in FIG. 4.

S104: accord to that starting time and the end time defined by the retrieval conditions, generating a corresponding point accord to the row and column number information in the 2D temporal grid, and searching the point in the generated R-tree spatial index structure to get the geotagged video clips corresponding to that point.

Figure 5:
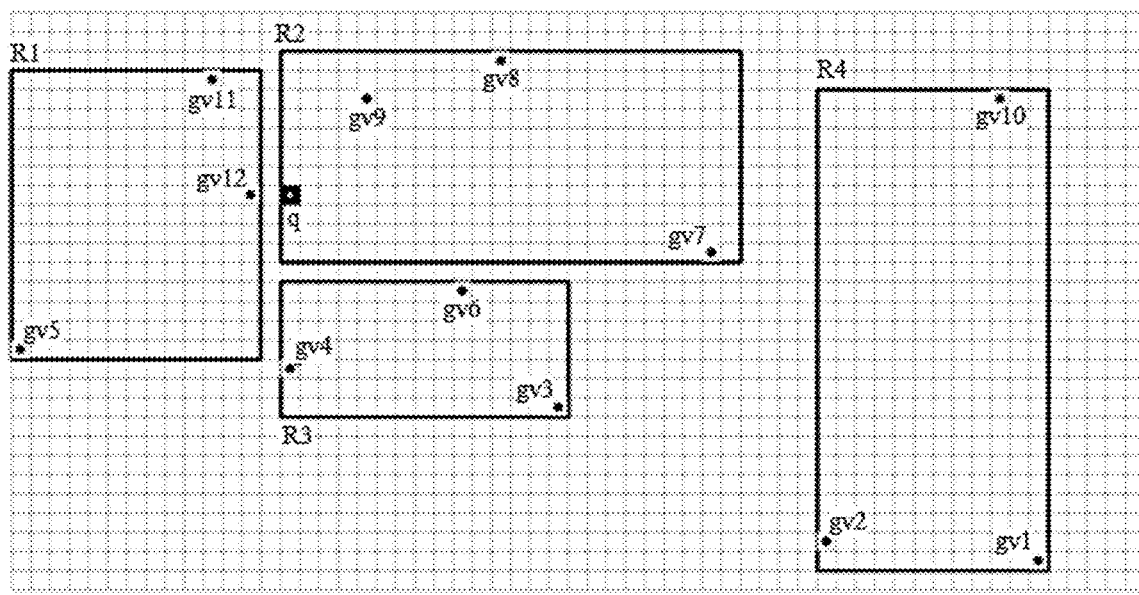
FIG. 5 is a schematic diagram of a process of geotagged video retrieval based on the 2D temporal grid provided by an embodiment of the invention.

In an illustrated embodiment, the searching the spatial point in the generated R-tree spatial index structure specifically includes: searching for the directory rectangle that satisfies query conditions and locating the searched directory rectangle into the intermediate node corresponding thereto; and then searching the sub-nodes of the located intermediate node to find a spatial point object that satisfy the retrieval conditions. As shown in FIG. 5, a point q represents the defined time retrieval conditions. According to the R-tree index, the point q is located in the directory rectangle, and the video clips that meet the conditions may only exist in the directory rectangle R2. Therefore, it is only compared with the subordinate sub-nodes gv7, gv8, and gv9 of R2, thereby improving the retrieval efficiency.

The invention combines massive video retrieval requirements, from the perspective of the 2D grid, and combines the start time and end time of the geotagged video shooting to define the 2D temporal grid according to the corresponding temporal resolution; using the row and column information of grid cells to express temporal information of the geotagged video; converting the grid cells into spatial point objects, and apply the spatial indexing method to construct a temporal index based on the 2D temporal grid, the temporal-based geotagged video query can be performed in a graphical manner, which reduces the processing complexity of temporal information of the geotagged video and significantly improves query efficiency.

In order to test the retrieval efficiency of the geotagged video spatial indexing method for video retrieval provided by the invention, the invention also provides the following experimental data.

Figure 6:
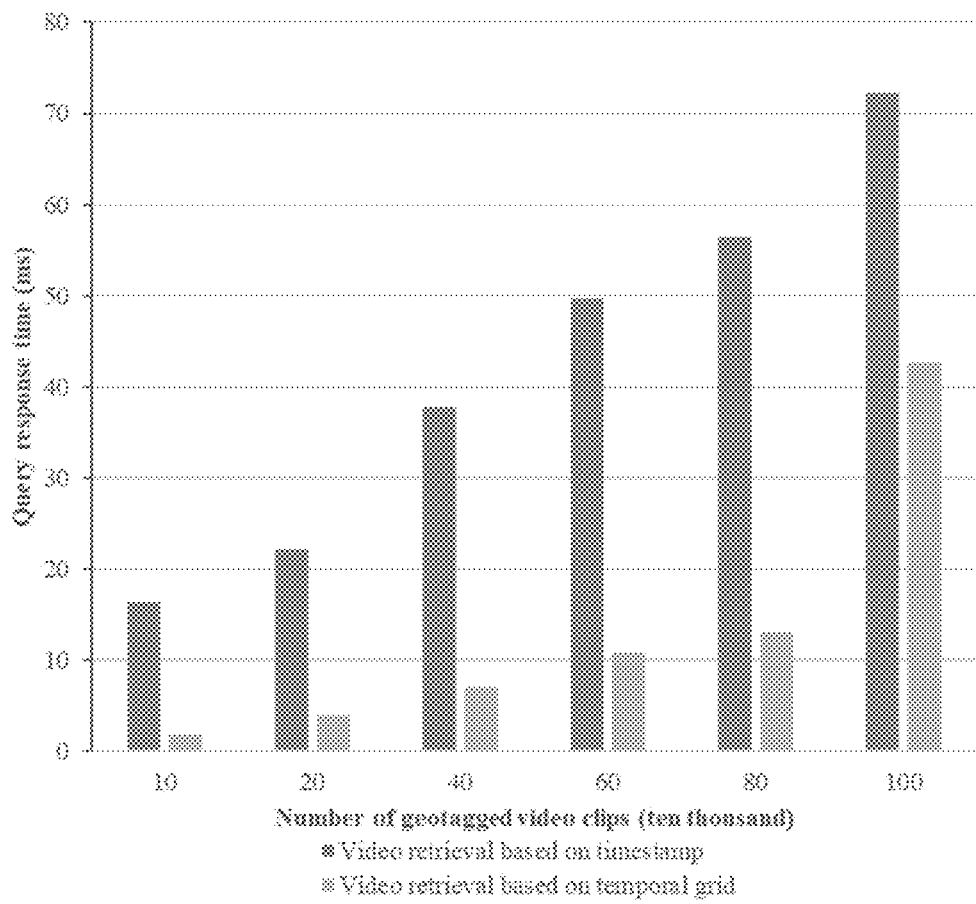
FIG. 6 is a schematic diagram of a test result of a geotagged video retrieval efficiency provided by an embodiment of the invention.

According to the geotagged video spatial indexing method for video retrieval provided by the invention, six geotagged video data sets from 100,000 to 1,000,000 records are used to test the response time of the retrieval. And compared with a retrieval method of traditional timestamp-based B-tree index. As shown in FIG. 6, in the case of different amounts of data, the geotagged video spatial indexing method for video retrieval based on the 2D temporal grid can significantly improve the retrieval efficiency. Among them, the maximum improvement is achieved when there are 800,000 records, and the response time is shortened by 43.34 ms. Although the retrieval efficiency decreased slightly with the increase of data volume, it still shortened the response time by 29.62 ms at 1,000,000 records. In practical applications, query optimization methods such as cache size optimization will further improve retrieval efficiency.

Finally, it should be noted that the above embodiments are only used to illustrate the technical solution of the invention, not to limit it. Although the invention has been described in detail with reference to the foregoing embodiments, those of ordinary skill in the art should understand that the technical solutions described in the foregoing embodiments can still be modified, or some of the technical features can be equivalently replaced; these modifications or substitutions do not make the essence of the corresponding technical solutions depart from the spirit and scope of the technical solutions of the embodiments of the invention.

What is claimed is:

1. A geotagged video spatial index method for video retrieval based on a two-dimensional (2D) temporal grid, comprising:

step 1: calculating row and column number information of each of geotagged video clips in the 2D temporal grid by combining a start time $t_s$ and an end time $t_e$ of each of the geotagged video clips based on an earliest start time $T_s$ of the geotagged video clips, a latest end time $T_e$ of the geotagged video clips and a preset duration ct, and thereby mapping time interval expressed as $[t_s\ t_e]$ of each the geotagged video clip to the 2D temporal grid based on the preset duration ct and the row and column number information of each the geotagged video clip in the 2D temporal grid; wherein the 2D temporal grid comprises: M*N numbers of temporal grid cells, N represents columns of the 2D temporal grid, $N=(T_e-T_s-ct)/ct$, M represents rows of the 2D temporal grid, $M=(N+1)/2$; the geotagged video clips corresponds to the temporal grid cells one by one, and location information of each of the temporal grid cells represents the time interval of the corresponding geotagged video clip, and the step 1 specifically comprises:

step A1: calculating original column number information u and row number information v of the k-th geotagged video clip under the preset duration ct using a formula (1):

$$\begin{cases} u = \frac{(t_k^s - T_s)}{ct} \\ v = \frac{(t_k^e - T_s)}{ct} \end{cases} \quad (1)$$

where $t_k^s$ and $t_k^e$ represent the start time and the end time of the k-th geotagged video clip respectively; $T_S$ represents the earliest start time among the geotagged video clips, $T_s=\min(\{t_k^s\})$, k=1, 2, 3 . . . K, and K represents a total number of the geotagged video clips;

step A2: expressing the original row and column number information in a form of a vector (u, v, 1), and obtaining the column number information j and the row number information i of the k-th geotagged video clip in the 2D temporal grid by calculating the vector according to preset rules;

wherein the preset rules comprise:

j=u and i=v when $1 \le u < (N+1)/2$ and $1 < v \le (N+1)/2$;

the vector (u, v, 1) is converted to (j, i, 1) using a formula (2) when $v > u+(N+1)/2$, $1 \le u \le (N+1)/2$, and $(N+1)/2 < v \le N$:

$$(j\ i\ 1) = (u\ v\ 1) \times \begin{pmatrix} 0 & 1 & 0 \\ 1 & 0 & 0 \\ -1 & 0 & 1 \end{pmatrix}; \quad (2)$$

the vector (u, v, 1) is converted to (j, i, 1) using a formula (3) when $(N+1)/2 < v \le u+(N+1)/2 \le N$, and $1 \le u \le (N+1)/2$:

$$(j\ i\ 1) = (u\ v\ 1) \times \begin{pmatrix} 1 & 0 & 0 \\ 0 & 1 & 0 \\ 0 & -\frac{(N+1)}{2} & 1 \end{pmatrix}; \quad (3)$$

the vector (u, v, 1) is converted to (j, i, 1) using a formula (4) when $(N+1)/2 < u \le N$, and $(N+1)/2 \le v \le N$:

$$(j\ i\ 1) = (u\ v\ 1) \times \begin{pmatrix} 1 & 0 & 0 \\ 0 & 1 & 0 \\ 0 & -\frac{(N+1)}{2} & 1 \end{pmatrix}; \quad (4)$$

where N represents the columns of the 2D temporal grid, $N=(T_e-T_s-ct)/ct$, and $T_e$ represents the latest end time among the geotagged video clips, $T_e=\max(\{t_k^e\})$;

step A3: taking the temporal grid cell located at the i-th row and the j-th column in the 2D temporal grid as the temporal grid cell $C_k$ (j, i) corresponding to the k-th geotagged video clip, based on the column number information j and the row number information i of the k-th geotagged video clip;

wherein time semantics of the temporal grid cell $C_k$ (j, i) is defined as follows:

when $1 \le j < M$, $1 \le i < M$ and j<i, the time semantics of the temporal grid cell $C_k$(j, i) starts at j and ends at i;

when $M < j \le N$, $1 \le i < M$ and $j \ge i+M$, the time semantics of the temporal grid cell $C_k$(j, i) starts at i and ends at j+1;

when $M < j \le N$, $1 < i \le M$ and $j < i+M$, the time semantics of the temporal grid cell $C_k$(j, i) starts at j and ends at i+M; or when $1 \le j \le M$, $1 \le i \le M$ and $j \ge i$, the time semantics of the temporal grid cell $C_k$ (j, i) starts at j and ends at i+M;

step 2: generating a spatial point for each of the geotagged video clips, based on the row and column number information of each of the geotagged video clips in the 2D temporal grid, and building a spatial point set P by the spatial points of the geotagged video clips;

step 3: generating a R-tree spatial index structure corresponding to the spatial point set P using a R-tree spatial index method;

step 4: according to a starting time and an end time defined by retrieval conditions, generating a corresponding point accord to row and column number information in the 2D temporal grid, and searching the point in the generated R-tree spatial index structure to get geotagged video clips corresponding to the point.

2. The geotagged video spatial indexing method for video retrieval based on the 2D temporal grid according to claim 1, wherein in the step 2, the generating a spatial point for each of the geotagged video clips, comprises:

taking the column number information j of the k-th geotagged video clip in the 2D temporal grid to be as x, and the row number information i of the k-th geotagged video clip in the 2D temporal grid to be as y, and thereby generating the spatial point $p_k(x, y)$ of the k-th geotagged video clip; where k=1, 2, 3 ..., K, and K represents a total number of the geotagged video clips.

3. The geotagged video spatial indexing method for video retrieval based on the 2D temporal grid according to claim 1, wherein the step 3 comprises:

performing segmentation on a spatial range where the spatial point set P is located to obtain rectangular regions; wherein each of the rectangular regions is called a directory rectangle and used as an intermediate node of a tree structure; and allocating the spatial points to the rectangular regions according to spatial locations, and generating sub-nodes of the intermediate nodes.

4. The geotagged video spatial indexing method for video retrieval based on the 2D temporal grid according to claim 3, wherein in the step 4, the searching the point in the generated R-tree spatial index structure comprises:

searching for the directory rectangle that satisfies the retrieval conditions and locating the searched directory rectangle into the intermediate node corresponding thereto; and searching the sub-nodes of the located intermediate node to find a spatial point object that satisfy the retrieval conditions.

* * * * *